Patented Sept. 18, 1928.

1,684,868

UNITED STATES PATENT OFFICE.

IRVIN H. JONES, OF MANHATTAN, ILLINOIS, ASSIGNOR TO THE KOPPERS COMPANY, OF PITTSBURGH, PENNSYLVANIA, A CORPORATION OF PENNSYLVANIA.

PRODUCTION OF RESINS.

No Drawing.   Application filed July 2, 1924.   Serial No. 723,830.

The present invention relates to the production of resins, and more especially to the production of a light colored "coumarone" resin from solvent naphtha.

Solvent naphtha is one of the fractions obtained from the distillation of light oil recovered as a by-product in coke and coal, other fractions being benzol, toluol, etc. The crude solvent naphtha fraction as obtained from the distillation of the light oil contains, among other things, coumarone and indene existing in liquid unpolymerized condition. These coumarone and indene bodies may be polymerized into para coumarone and para indene, which form the resin commonly known in the trade as "coumarone" resin. The usual coumarone resin of commerce is of a dark to a light red in color, due to the presence of dark colored impurities. Various treatments have been resorted to in an endeavor to produce light colored resins. The usual treatment has been to subject the crude solvent naphtha to a preliminary polymerization with a small amount of acid or a dilute acid, so as to cause a polymerization of the dark colored impurities. The polymerized dark colored impurities have then been removed by drawing off the acid sludge and usually in addition by distilling the naphtha, the distillate being subjected to a polymerization treatment usually with concentrated sulphuric acid so as to effect the polymerization of the coumarone and indene bodies. In this process, reliance has been placed upon the selective polymerization of the dark colored impurities by the preliminary polymerization treatment and their removal in the acid sludge or by distillation prior to the final or resin polymerization. It has been found that while this treatment, if carefully carried out, results in a much lighter resin than that produced without the preliminary polymerization, the results are inclined to be variable and the resin is usually not so entirely free from dark colored impurities as might be desired.

The solvent naphtha which has been used for resin production has been a cut between certain boiling points so as to include all or a more limited part of the solvent naphtha fraction of the light oil. The cuts which have been taken between certain boiling points have been only approximate and the cuts have contained more or less of the constituents having boiling points below or above the nominal limits of the cut. Among these constituents have been the dark resin-forming bodies which the preliminary polymerization has been relied upon to remove. In addition to the dark resin-forming bodies, there are higher boiling constituents, small quantities of which are present in the usual cuts taken from the solvent naphtha range and which tend to soften or lower the melting point of the resultant resin.

In these processes as heretofore carried out, traces of these undesirable constituents have persisted in naphtha despite the preliminary polymerization and distillation.

I have discovered that if the naphtha is subjected to a very careful fractionation, substantially all traces of these undesirable constituents may be eliminated and a very light colored coumarone resin, comparable to the rosin sold on the market as "water-white" and of a quality which may be incorporated in the highest grade varnishes, may be consistently produced by a reliable and commercially practicable process. The so-called "cuts" which have been employed in the production of solvent naphtha between certain stated boiling points have not been so carefully taken as to eliminate substantially all traces of the undesirable constituents. For example, the commercial cut of solvent naphtha which I prefer to use as the crude material for my process generally shows on a standard bulb distillation, not more than 5% distilling over at 150° C. and not less than 95% distilling over at 200° C. Such a cut is ordinarily spoken of as a 150° to 200° boiling point cut. However, I have found that careful fractionation through a long Hempel column, or other fractionating apparatus of equal accuracy, shows that such naphtha contains constituents boiling as low as 39° C. and a very considerable residue at 200° C. In a typical commercial solvent of the specifications given above when subjected to rigid fractionation, as much as 14% has been run off below 150° C. and a residue amounting to as much as 16% has remained behind when the vapor temperature has reached 205° C.

My process will now be described in detail, starting with the crude solvent naphtha. Any of the usual grades or cuts of crude solvent naphtha may be employed, although I have generally used the commercial cut between 150° and 200° C.

The crude solvent naphtha is first washed with about 5% by volume of 50° Bé. sulphuric acid for about 45 minutes whereby the naphtha is subjected to a preliminary polymerization treatment, as described, for example, in the Darrin Patent No. 1,297,328. The washing is carried out in any suitable agitator. After the acid wash is completed, the acid sludge is allowed to settle and is drawn off. This preliminary acid treatment polymerizes the greater portion of the resin-darkening bodies in the crude solvent naphtha. Most of these polymerized bodies settle out with the acid sludge, although some small amount remains in solution in the naphtha. The naphtha is next washed with about 5% by volume of a 15% caustic soda water solution in a suitable agitating vessel for about 20 minutes. The alkaline sludge is allowed to settle and is drawn off. This alkaline wash removes certain sulphonated bodies which might otherwise be decomposed, volatilized and returned again to the naphtha during the subsequent step of steam distillation and which would tend to darken the resin.

The naphtha is then washed for a few minutes with about 20% of its volume of water.

The naphtha is then distilled with steam and a nearly water-white product is condensed. The condensate is usually about 90% to 95% of the original solvent. The still residue consists principally of the bodies polymerized or otherwise rendered non-volatile by the previous treatments and which, remaining in solution in the naphtha, were not washed out by the acid, the caustic and the water washes.

The naphtha is then given a very careful fractionation by means of a still provided with a long fractionating column, preferably a long column of the Hempel type. The type of still and fractionating column used in benzol recovery may be used for this purpose. This careful fractionating eliminates from the naphtha substantially all traces of its resin-darkening and resin-softening constituents.

Some of the undesirable compounds which may appear in commercial solvent naphtha and their approximate boiling points are as follows:

| | Approximate boiling point. (Degrees centigrade.) |
|---|---|
| Cyclopentadiene | 41 |
| Dihydrobenzene | 84–86 |
| Dihydrotoluene | 110 |
| Tetrahydrobenzene | 82–84 |
| Tetrahydrotoluene | 105–106 |
| Styrolene | 144 |
| Dihydronaphthalene | 212 |
| Tetrahydronaphthalene | 206–207 |
| Naphthalene | 218 |

The above mentioned constituents, including styrolene and those of lower boiling point, react with sulphuric acid to cause dark colored products which if not removed, discolor the resin. The naphthalenes are objectionable because they tend to remain in the resin and soften it or lower its melting point.

The cut taken in this careful fractionation should be such as to eliminate substantially all traces of the constituents of the naphtha having boiling points below about 145° C. and above 205° C. In practice the cut is usually taken from about 150° C. to about 200° C., which leaves a slight leeway. This cut is usually about 60% to 65% by volume of the original crude solvent naphtha.

The rigid fractionation of the solvent naphtha eliminates substantially all of the resin-darkening and resin-softening constituents which persist in appreciable amounts through the initial acid polymerization treatment, the alkaline wash and the steam distillation. The rigid fractionation of the naphtha as above described is apparently the most important of the four steps in the process so far described, although the preliminary polymerization, the alkaline wash and the steam distillation all materially contribute in the production of the lightest colored resins. The fractionation step does not necessarily follow in sequence after the steps of the preliminary polymerization, alkali washing and steam distillation. If desired, the careful fractionation may be carried out on the raw solvent as it is received from the benzol plant prior to the preliminary polymerization, alkaline wash and steam distillation, or may be interposed between such steps.

The naphtha which has thus been preliminarily polymerized, alkali washed, steam distilled and carefully fractionated, is then in condition for the final or resin polymerization. This is carried out by agitating the naphtha with about one half of one percent by volume at 66° Bé. (concentrated) sulphuric acid. The reaction is exothermic and as pointed out by Wendriner in his German Patent No. 281,432, precautions should be taken to prevent the temperature from rising too high. It is preferable not to allow the temperature to rise above about 30° C., although it may rise to 40° or 50° C. without serious ill effects. The temperature may be controlled in any suitable way as suggested by Wendriner, as for example, by inserting cooling coils in the agitator.

It is preferred to dilute the naphtha with some inert diluent prior to the resin polymerization treatment, as described in the Sperr Patent No. 1,246,671. As pointed out in the Sperr patent, the dilution of solvent naphtha with a substantially inert diluent, such for example as previously acid-purified benzol and toluol, keeps the naphtha in a fluid oily condition, relatively easy to handle and overcomes the difficulties resulting from emulsification which would be encountered without such dilution. I preferably employ about 60% to 70% by volume of an inert diluent which is preferably a lower boiling point fraction, such as benzol and toluol, which has been previously treated with sulphuric acid to polymerize its polymerizable constituents thus yielding a benzol or toluol which is inert to further acid treatment. If desired, solvent naphtha from which the resin-forming constituents have been removed by polymerization may be employed as the inert diluent. Such diluent tends to prevent the polymerization reaction from becoming too vigorous and thus assists in the temperature control. It also keeps the solvent more fluid during the polymerization treatment, which permits it to be handled and washed more easily.

The action of the concentrated sulphuric acid is to cause a polymerization of the coumarone and indene constituents of the naphtha into the resin commonly known as "coumarone-resin" and which consists principally of the polymerized para coumarone and para indene. After the polymerization is complete, which can be determined by the cessation of rise in temperature, the naphtha is agitated for a few minutes with about 5% by volume of a 20% caustic soda water solution. The emulsion is allowed to settle out and the supernatant solution of the polymerized resin in the naphtha is run into a vacuum still, where it is subjected to a vacuum distillation. The still is carefully heated, preferably by means of an oil bath, to a temperature of not over about 150° to 160° C. A fine stream of air is passed constantly through the mixture to assist in carrying off the distilling naphtha. This stream of air also tends to keep the contents of the still in motion and aids in heat distribution. It is found that the quality of the resin is improved if the distillation to remove the naphtha from the resin be carried out at the lowest possible temperature, in order to obviate any decomposition which might result at higher temperatures. A vacuum rather than a steam distillation is preferred because of the tendency of the steam to become emulsified and become incorporated in the resin which tends to make the resin opaque. The distillation is carried to a point to give the necessary hardness to the resin.

The naphtha distilled off from the polymerized resin may be used as the diluent in the polymerization of further batches of resin-bearing solvent naphtha.

The coumarone resin produced by this pressure is of a light yellow amber color. It is transparent and looks much like amber and the fossil resins. It is substantially free from the reddish color which has heretofore characterized most coumarone resin. The process may be carried out economically on a plant scale and can be relied upon to give consistent results.

While I have described in detail the steps of the process, it will be understood that the invention is not limited to the exact details described nor is the invention limited to the exact sequence of steps as set forth, since it will be apparent that certain steps may be interchanged. The process is therefore susceptible to variations and modifications within the scope of my invention as defined in the following claims.

I claim:

1. The process of making light colored coumarone resin from solvent naphtha, which comprises subjecting the solvent naphtha to a preliminary polymerizing treatment to polymerize resin-darkening bodies therein, distilling the naphtha to separate it from the polymerized resin-darkening bodies held in solution, carefully fractionating the naphtha to eliminate substantially all traces of its resin-darkening and resin-softening constituents having boiling points below about 145° C. and above about 205° C., and thereafter subjecting the naphtha so treated to a resin polymerizing treatment.

2. The process of making light colored coumarone resin from solvent naphtha, which comprises subjecting the solvent naphtha to a preliminary polymerizing treatment to polymerize resin-darkening bodies therein, subjecting the naphtha to an alkaline wash, steam distilling the naphtha to separate it from the polymerized resin darkening bodies held in solution, carefully fractionating the naphtha so as to eliminate substantially all traces of its resin-darkening constituents having boiling points below about 145° C., thereafter subjecting the naphtha to a resin polymerizing treatment, and subjecting the naphtha to a vacuum distillation to recover the polymerized resin.

3. The process of making light colored coumarone resin from solvent naphtha, which comprises eliminating substantially all traces of its resin-darkening and resin-softening constituents having boiling points below about 145° C. and above about 205° C. by a preliminary purifying treatment which includes both fractionation and preliminary polymerization, and subjecting the naphtha so purified to a resin polymerizing treatment.

4. The process of making light colored coumarone resin from solvent naphtha, which comprises subjecting the solvent naphtha to a perliminary polymerizing treatment to polymerize resin-darkening bodies therein, subjecting the naphtha to an alkaline wash, steam distilling the naphtha to separate it from the polymerized resin-darkening bodies held in solution, carefully fractionating the naphtha to eliminate substantially all traces of its resin-darkening and resin-softening constituents having boiling points below about 145° C. and above about 205° C. and thereafter subjecting the naphtha so treated to a resin polymerizing treatment.

In testimony whereof I have hereunto set my hand.

IRVIN H. JONES.